June 9, 1953　　　D. F. HOTH ET AL　　　2,641,757
AUTOMATIC MULTICHANNEL SELECTION
Filed May 17, 1950　　　　　　　　　　　9 Sheets-Sheet 1
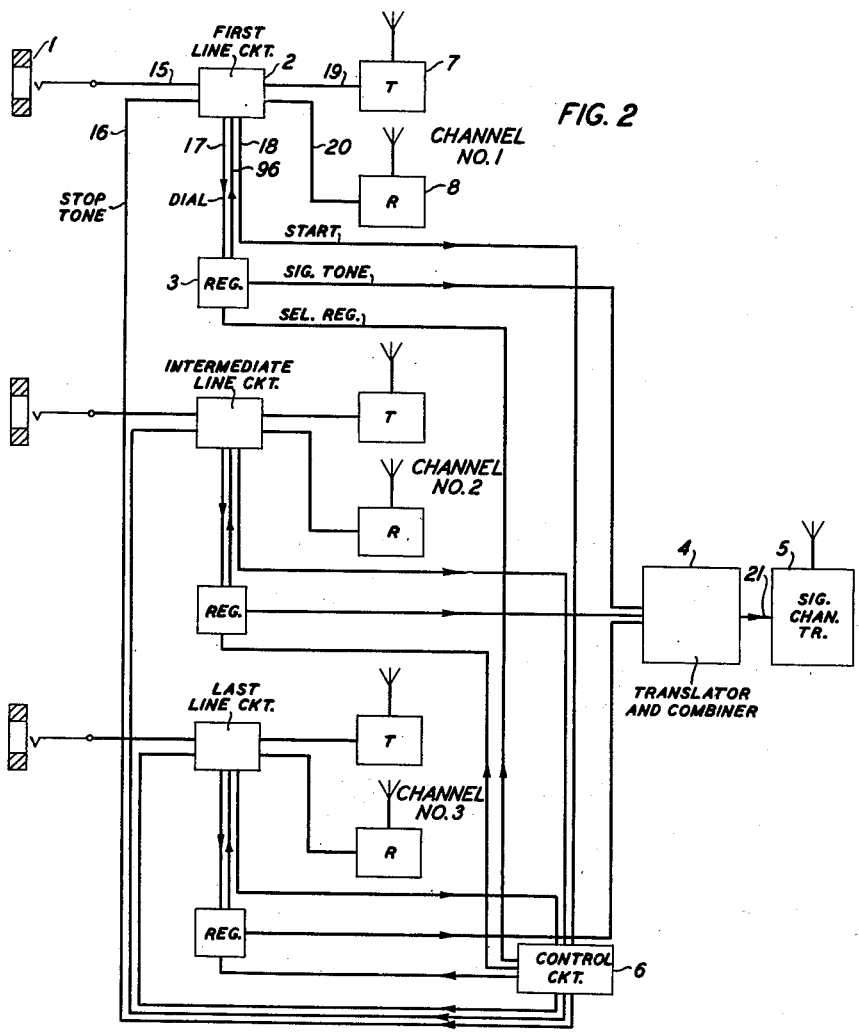
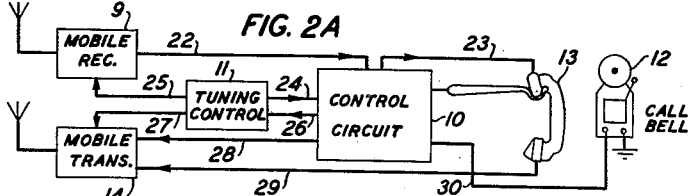
INVENTORS D. F. HOTH
R. O. SOFFEL
BY
ATTORNEY

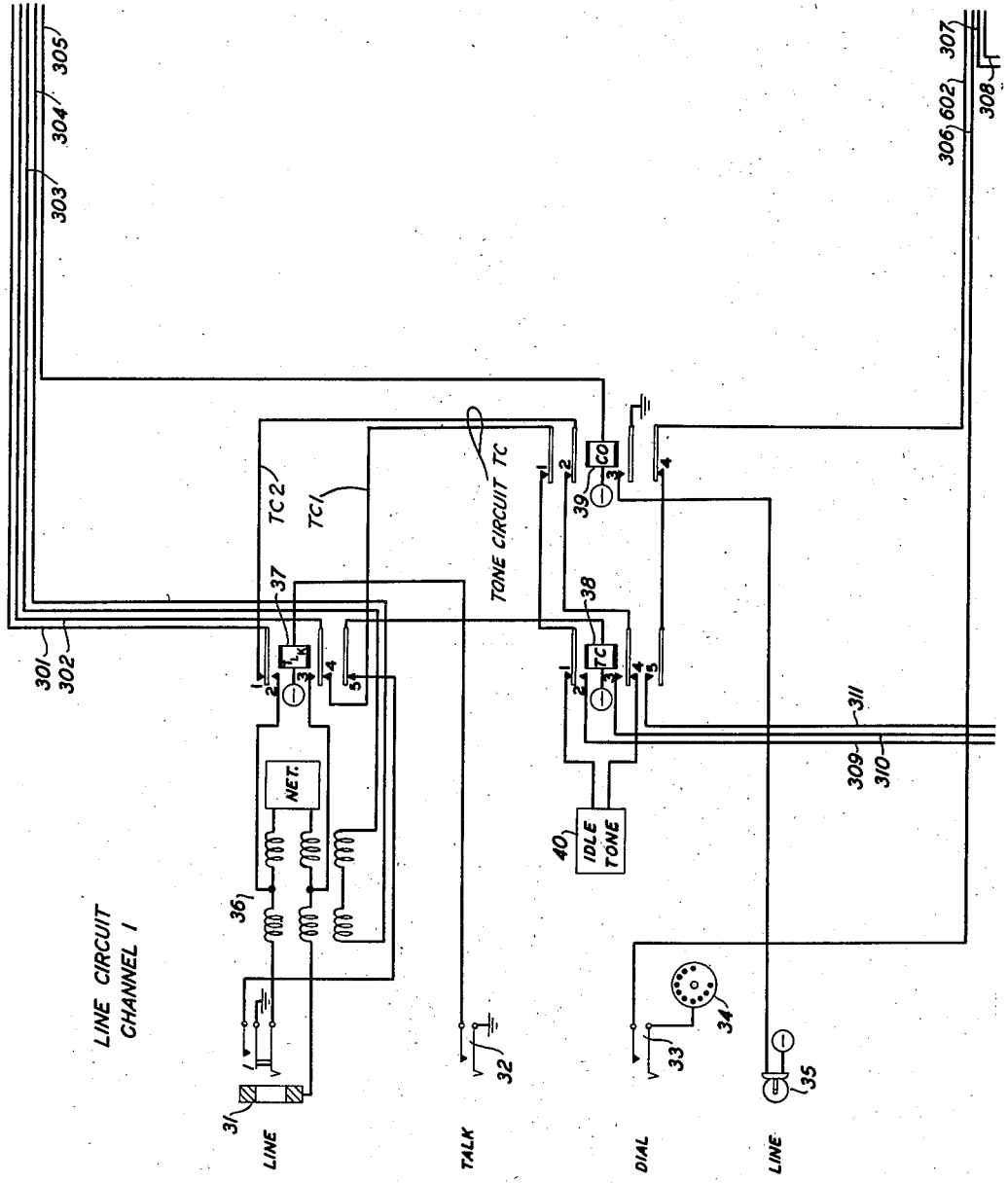

INVENTORS D. F. HOTH
R. O. SOFFEL
BY G. H. Stevenson
ATTORNEY

June 9, 1953   D. F. HOTH ET AL   2,641,757
AUTOMATIC MULTICHANNEL SELECTION
Filed May 17, 1950   9 Sheets-Sheet 4

INVENTORS  D. F. HOTH
R. O. SOFFEL
BY G. H. Stevenson
ATTORNEY

INVENTORS D. F. HOTH
R. O. SOFFEL
ATTORNEY

June 9, 1953  D. F. HOTH ET AL  2,641,757
AUTOMATIC MULTICHANNEL SELECTION
Filed May 17, 1950  9 Sheets-Sheet 9

INVENTORS D. F. HOTH
R. O. SOFFEL
BY G. H. Stevenson
ATTORNEY

Patented June 9, 1953

2,641,757

UNITED STATES PATENT OFFICE 2,641,757

AUTOMATIC MULTICHANNEL SELECTION

Daniel F. Hoth, Millburn, N. J., and Robert O. Soffel, Hastings on Hudson, N. Y., assignors to Bell Telephone Laboratories, Incorporated, New York, N. Y., a corporation of New York Application May 17, 1950, Serial No. 162,516

6 Claims. (Cl. 343—177)

This invention relates to telephone systems and especially to a multichannel common medium transmission system between a central or base station and a plurality of mobile stations.

An object of the invention is to enable any one of a large number of outlying stations to be selectively signaled from a central calling station and be directed to connect itself to a particular one of a plurality of transmission channels, and to deny all other stations access to this channel.

Another object of the invention is to enable any one of a large number of outlying stations to establish a connection to the base station over any idle one of a plurality of transmission channels, and to cause all other stations to be denied access to this channel.

Although this invention may be employed in any communication or signaling system, the embodiment in which the invention is here described is a mobile radio telephone system. As specifically applied to such a system, one of the objects is to provide a greatly improved grade of service to mobile radio subscribers. Heretofore, mobile radio systems have operated on the same principle as a party line except that the number of mobile subscribers greatly exceeds the number of parties that would ordinarily be put on one line. By providing each mobile subscriber with access to a plurality of channels, the grade of service so obtained is much better than that obtained by dividing the number of mobile subscribers in smaller groups and assigning each group to one channel only. Furthermore, a larger number of mobile subscribers can be accommodated by a multichannel system where all mobile subscribers have access to all channels than by a system having several exclusive channels.

Another object of the invention is to provide privacy for the mobile subscribers by denying access of other subscribers to busy channels. In this system each mobile station has access to a plurality of communication channels and to a common signaling channel. When the mobile station is not in use its receiver is always tuned to the frequency of the common signaling channel. Each base station transmitter radiates a modulation of distinctive frequency, hereinafter called the idle tone, whenever the channel associated with that transmitter is not in use, and the mobile station can seize only a channel marked with this idle tone.

In this specification a transmission channel will be understood to comprise two carrier frequencies, one for transmission in one direction and the other for transmission in the opposite direction. The signaling or calling channel, however, uses only one frequency and hence may be considered only half a channel. At the base station a separate transmitter and receiver are provided for each communication channel and a separate transmitter for the signaling channel. Each mobile station is provided with a transmitter and a receiver.

Although for the purpose of this invention any system of selective signaling may be employed, the method herein described comprises the simultaneous transmission of a combination of any four of thirty alloted audio frequencies, each mobile station being assigned an exclusive combination, as described in the copending applications of H. C. Harrison, Serial No. 767,487, filed August 8, 1947, and D. F. Hoth-R. O. Soffel, Serial No. 56,186, filed October 23, 1948, the former having been issued on July 8, 1952 as Patent 2,602,853 and the latter having become abandoned.

The invention will be better understood from the following detailed description together with the accompanying drawings, in which:

Fig. 1 is a block diagram indicating the order in which the remaining figures are to be read;

Fig. 2 is a block diagram of a base station;

Fig. 2A is a block diagram of a mobile station;

Fig. 3 shows a portion of a line circuit of the base station;

Figure 4:
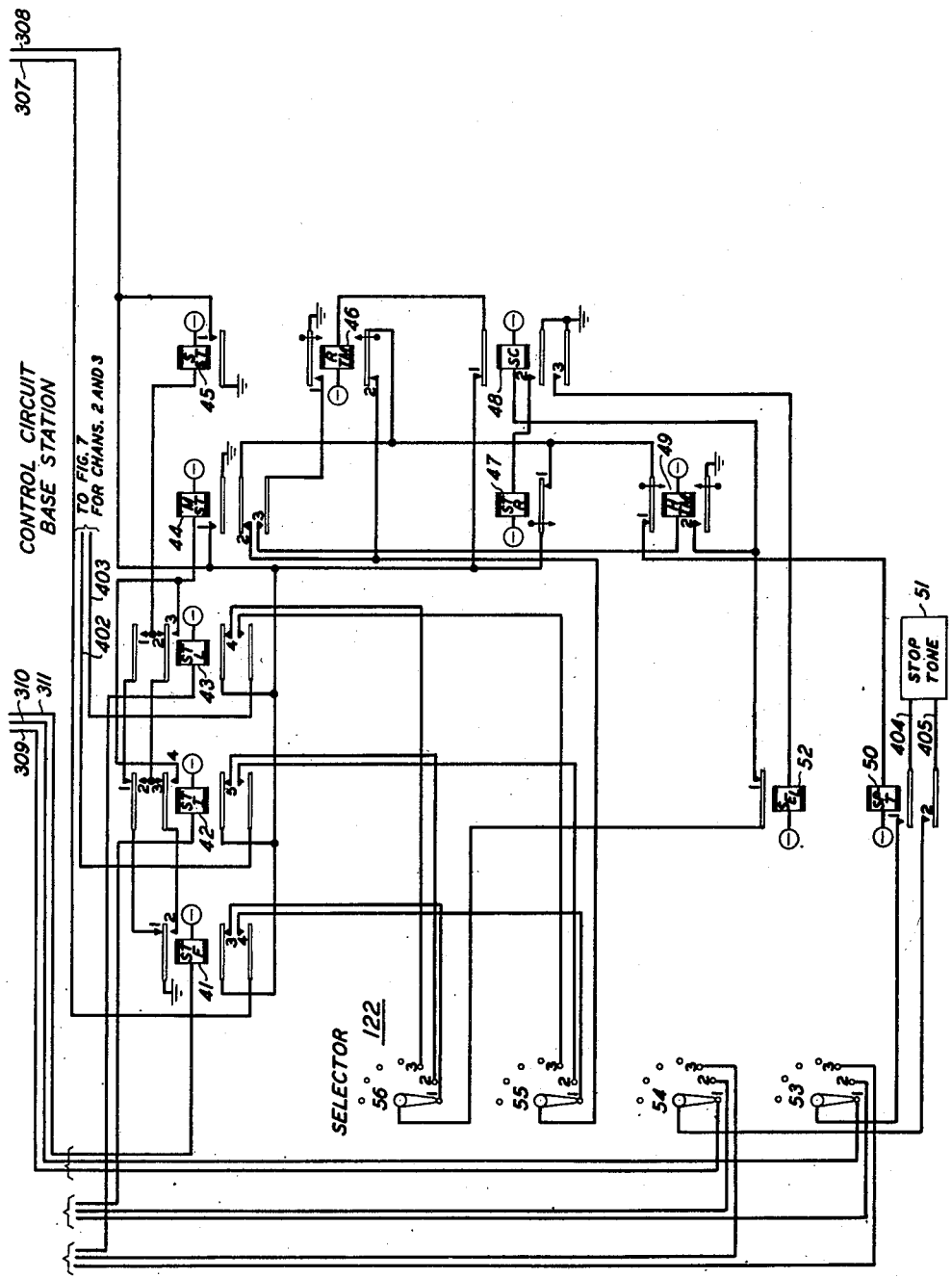
Fig. 4 illustrates a portion of the control circuit of the base station.

Figs. 3 to 10 inclusive, when juxtaposed in the order shown in Fig. 1, illustrate the complete system.

The general operation of the invention will first be explained in terms of the block diagram shown in Fig. 2. In this diagram, as well as in the succeeding figures, a system comprising three communication channels is illustrated, but it will be understood that by extension of the circuits described a larger number of channels may be provided for.

Referring to Fig. 2, when the operator at the base station desires to originate a call to a mobile station she will insert the plug of her cord circuit in a calling jack, as for example jack 1, provided this channel is idle. This will cause the idle tone to be removed from this channel, thus preventing any mobile station from originating a call on this channel, as will be explained hereinafter. By means of a dial or other means in the line circuit represented by block 2, the operator will cause the desired number to be registered in the register circuit represented by block 3 over the lead group 17. After the number has been registered in the register, a signal from the register is sent over lead 96 through the line circuit and over lead 18 to the control circuit 6. The control circuit causes the register to be connected to the translator and combiner 4, provided no other line circuit is attempting to originate a call at the same time. The translator converts the four-digit call number into a combination of four out of thirty audio frequencies in a manner disclosed by the aforesaid copending application of Hoth-Soffel, Serial No. 56,186. These frequencies are combined and transmitted over lead group 21 to the signaling channel transmitter 5 to modulate its carrier frequency and cause the latter to be radiated. This signal is received by all idle mobile receivers, but not more than one of them can respond.

When the register 3 is connected to the translator and combiner 4 an alternating current of distinct frequency, hereinafter called the stop tone, is caused to be radiated by the transmitter 7 of channel 1.

The calling signal transmitted over the calling channel by the base station is received by the desired mobile receiver represented by block 9 of Fig. 2A, and is transmitted over lead group 22 to the control circuit represented by block 10. The control circuit, on reception of the calling signal, causes the tuning control represented by block 11 to operate over lead 26. The tuning control, operating over lead groups 25 and 27, causes tuning mechanisms in the receiver 9 and the transmitter 14 to hunt over each channel setting in turn. When the channel is reached on which the stop tone radiated by the base station is being received, the control circuit 10 causes the tuning control 11 to stop hunting and the call bell 12 to ring over lead 30. When the subscriber removes the handset 13 from the switchhook the transmitter 14 is activated over lead 28 and radiates carrier. The output of the mobile receiver 9 is connected over lead group 22, through the control circuit 10, and over lead group 23 to the handset 13. The handset is also connected over lead group 29 to the transmitter 14. The mobile station is now in the talking condition. When the base station receiver 8 receives carrier from the mobile station the codan relay of the base station operates, thereby (a) removing the stop tone, and (b) lighting a line lamp, whereupon the operator releases the register and translator 4 and operates a key to put the line 2 in the talking condition.

When the mobile subscriber disconnects at the end of the call, his receiver is automatically restored to the signaling channel frequency.

When a mobile subscriber originates a call by removing his handset 13 from the switchhook, the control circuit 10 operates the tuning control 11 over lead group 26, causing the receiver 9 to hunt for an idle channel. At the same time the tuning control 11, over lead group 27, causes the mobile transmitter 14 to hunt over the channels in synchronism with the receiver. When the receiver finds a channel on which idle tone is present, hunting stops and the mobile transmitter 14 is energized over lead group 28 and consequently radiates carrier energy having a mean frequency corresponding to one of the two frequencies assigned to the idle channel.

When the particular base station receiver that is tuned to the above-mentioned idle channel receives the carrier energy radiated from the mobile transmitter, it energizes its codan relay thereby causing (a) immediate removal of idle tone from this channel, and (b) a line lamp to light to indicate to the operator that a mobile station has originated a call.

Call originated by base station

A detailed description of the invention will now be given for the case of a call originating at a base station.

Referring to Fig. 3, when the operator desires to originate a call she inserts the plug of her cord circuit into the jack of an idle line, as for example jack 31, which will be designated channel No. 1. Insertion of the plug into this jack connects ground through the armature and spring No. 1 of jack 31, through the contact 5 and armature of relay 37 and through the winding of the tone control relay 38 to battery, causing the latter relay to operate. The operation of relay 38 opens contacts 1 and 4, disconnecting the idle tone oscillator 40 which had previously been connected to the transmitter 72, Fig. 9, for this channel, over the following path: From the idle tone oscillator 40 through contact 1 and armature of the tone control relay 38, through contact 1 and armature of the codan operated relay 39, over conductor TC1 which together with conductor TC2 constitutes a tone circuit TC, through contact 4 and armature of the talk relay 37, over lead 302 to the transmitter 72 in Fig. 9, back over lead 301 to Fig. 3, through the armature and contact 1 of relay 37, over conductor TC2 of the tone circuit TC, through the armature and contact 2 of relay 39 and through the armature and contact 4 of relay 38 to the idle tone oscillator 40.

Figure 5:
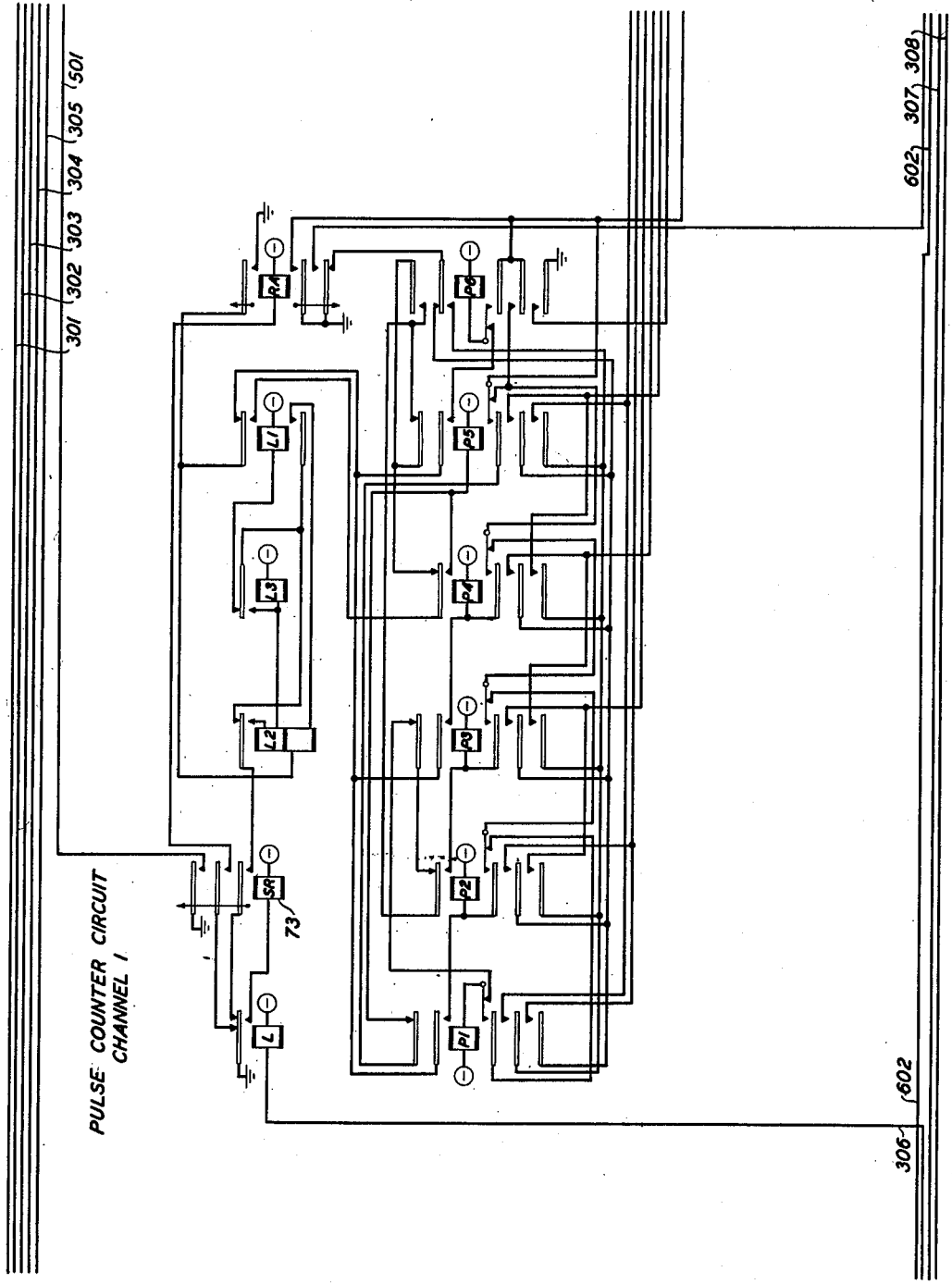
Figs. 5, 6 and 7 show details of a dial pulse counter, steering and register circuit of the base station.
Figure 6:
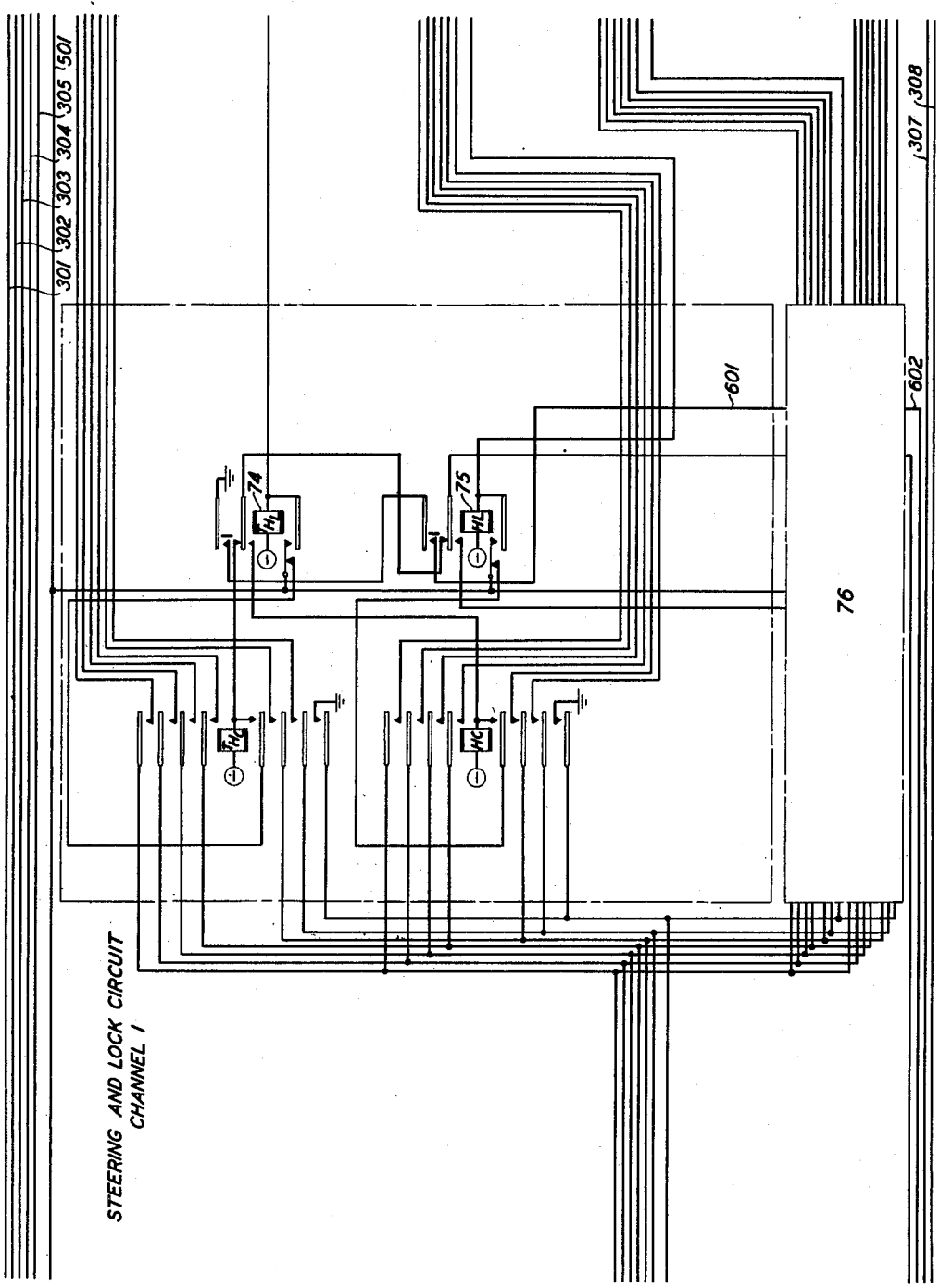

The operator next operates dial key 33 which connects dial 34 over lead 306 to Fig. 5. Figs. 5 and 6 and relays 77 to 82 in Fig. 7, together with boxes 58, 59 and 60, each of which contains a group of six relays similar to relays 77 to 82, comprise a dial pulse counter, steering and register circuit similar to that described in detail in the aforesaid copending application of Hoth-Soffel, Serial No. 56,186. When the operator has completed dialing four digits, relays 74 and 75 in Fig. 6 for the thousands and hundreds digits, together with similar relays for the tens and units digits in block 76 of Fig. 6, are all operated. A path is then closed from ground on the armature of relay 74 through its contact 1, through the armature and contact 1 of relay 75 and over lead 601 to block 76, through similar contacts on relays for the tens and units digits, over lead 602 to Fig. 3, through the armature and contact 4 of the unoperated relay 39, through the armature and contact 5 of the operated relay 38, over lead 311 to Fig. 4 and through the winding of the first start relay 41 to battery, causing the latter to operate. The contact network comprising the upper contacts of the start relays 41, 42 and 43 is used to indicate whether one or more than one start relay is energized. The operation of relay 41 connects ground on its armature to its contact 2, through the armature and contact 3 of the unoperated intermediate start relay 42, through the armature and contact 2 of the unoperated last start relay 43, and through the winding of the single start relay 45 to battery, causing the latter relay to operate. The operation of relay 45 connects ground from its armature to its contact 1, and through the armature and contact 5 of relay 42 to terminal 2 of arc 56 of the selector 122. The selector, comprising arcs 53, 54, 55 and 56, is a stepping switch which hunts for the line into which the operator has plugged and connects stop tone to that line. The ground just mentioned is also connected through the armature and contact 4 of the unoperated relay 43 to terminal 3 of arc 56 of the selector. Therefore, if the selector happens to be standing on terminal 2, for example, representing the corresponding line and channel, ground is applied over the wiper of arc 56, through the armature and contact 1 of selector operating magnet 52, and through the winding of the selector control relay 48 to battery, causing this relay to operate. The operation of relay 48 connects ground from its armature to contact 2, and through the winding of the selector magnet 52 to battery, causing the latter to operate. The operation of the selector magnet opens the circuit to relay 48, causing it to release. The release of relay 48 removes ground from the selector magnet winding, causing it to release. The release of the selector magnet 52 mechanically advances the selector 122 to the next position. In the present case this would be position 3, where ground is again connected to the wiper of arc 56, causing the above cycle to be repeated. In this manner the selector will be advanced until it reaches position 1, corresponding to the line circuit into which the operator has plugged. With relay 41 operated, ground is removed from contact 1 of arc 56, preventing the further operation of the selector control relay 48.

When relay 48 operated, as previously described, it connected ground from its armature to its contact 2 through the winding of the start ringing relay 47 to battery, causing the latter relay to operate. The operation of this relay performs no function at this time. Relay 47, being slow to release, holds operated during the time the selector is hunting for the channel having its start relay operated. When the selector stops hunting, relay 48 remains released, and after an interval of time relay 47 releases. The release of relay 47 closes a path from ground on the armature and contact 1 of the operated relay 45 through the armature and contact 1 of relay 47, through the armature and contact 1 of the unoperated relay 49, and through the winding of the stop tone relay 50 to battery, causing the latter to operate. The operation of relay 50 connects lead 404 from one side of the stop tone generator 51, through the armature and contact 1 of relay 50, through the wiper and contact 1 of arc 53 of the selector, to lead 310 to Fig. 3, through the No. 3 contact and armature of the operated relay 38, through the No. 2 contact and armature of the unoperated relay 39, through contact No. 1 and armature of the unoperated talk relay 37, and over lead 301 to the transmitter 72 in Fig. 9; and back from the transmitter over lead 302 to Fig. 3, through the armature and contact No. 4 of relay 37, through the armature and contact No. 1 of relay 39, through the armature and contact No. 2 of operated relay 38, over lead 309 to Fig. 4, through contact No. 1 and wiper of arc 54 of the selector, through contact No. 2 and armature of the operated relay 50, and over lead 405 to the other side of the stop tone generator 51.

Figure 9:
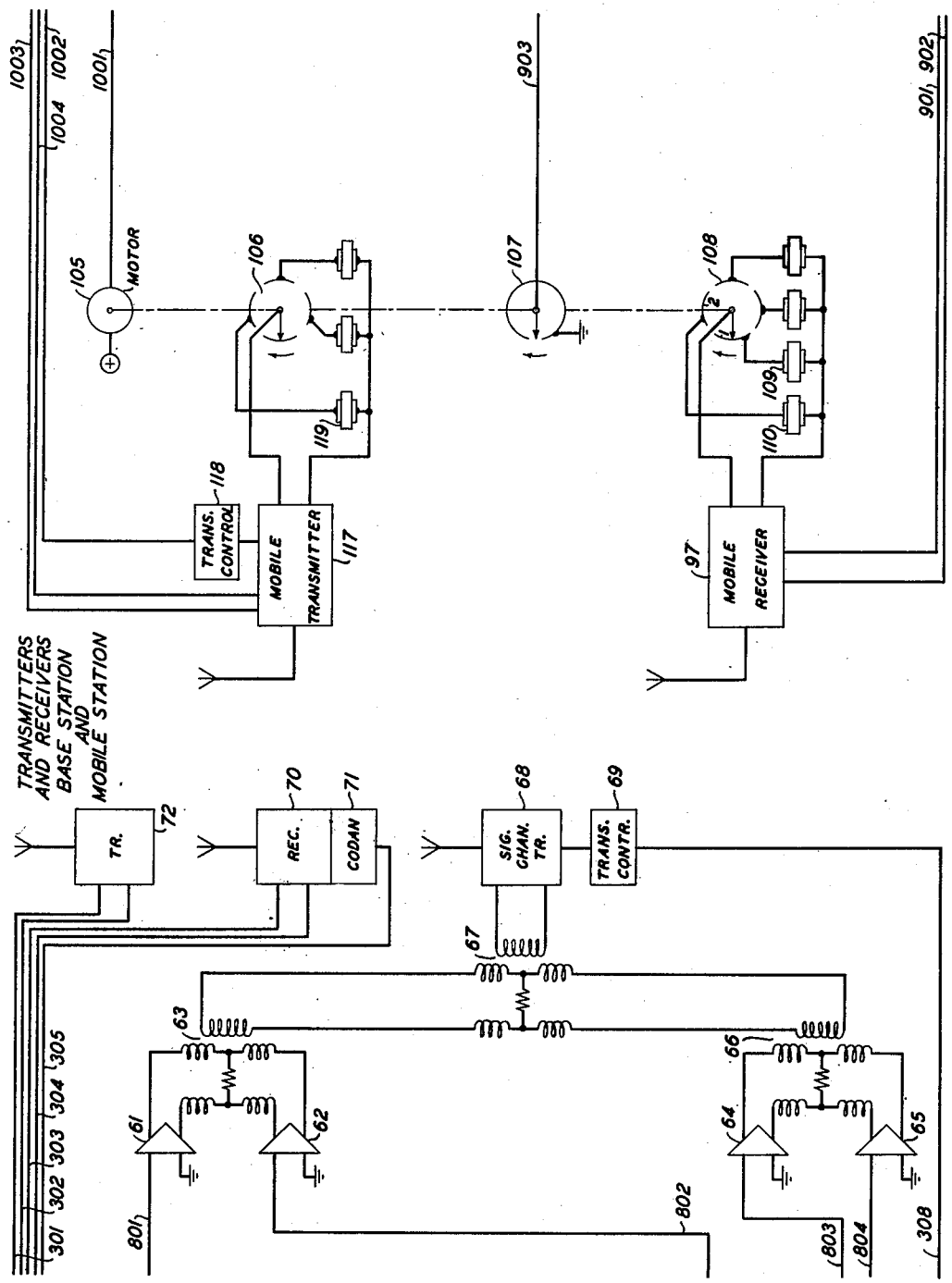
Fig. 9 shows the combiner circuit of the base station and transmitters and receivers of the base station and of a mobile station.

When relay 45 operated, as previously described, it connected ground from its armature through its contact 1 over lead 308 to Fig. 9 to energize the transmitter control circuit 69, which enabled the signaling channel transmitter 68.

Figure 7:
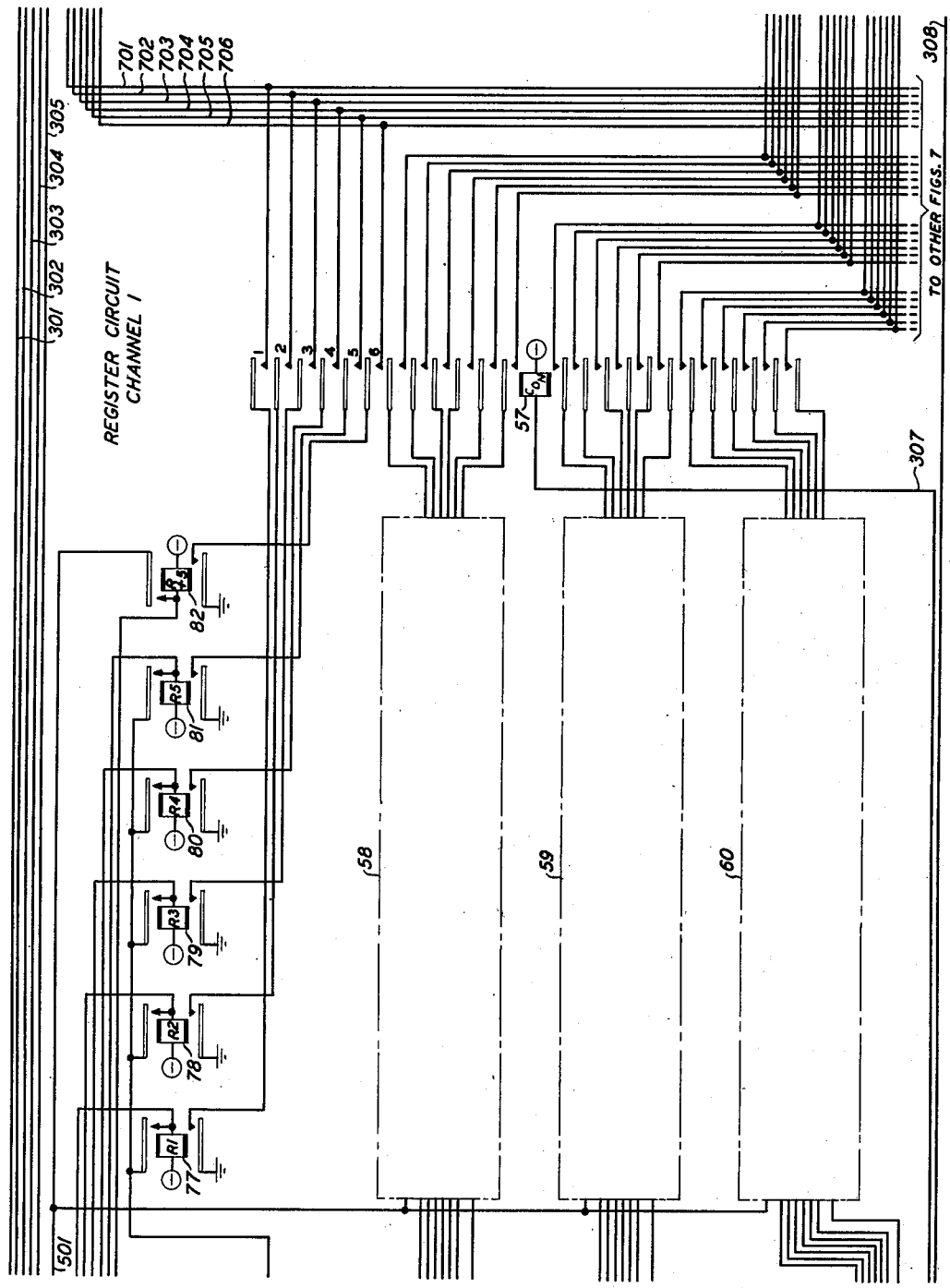
Figure 8:
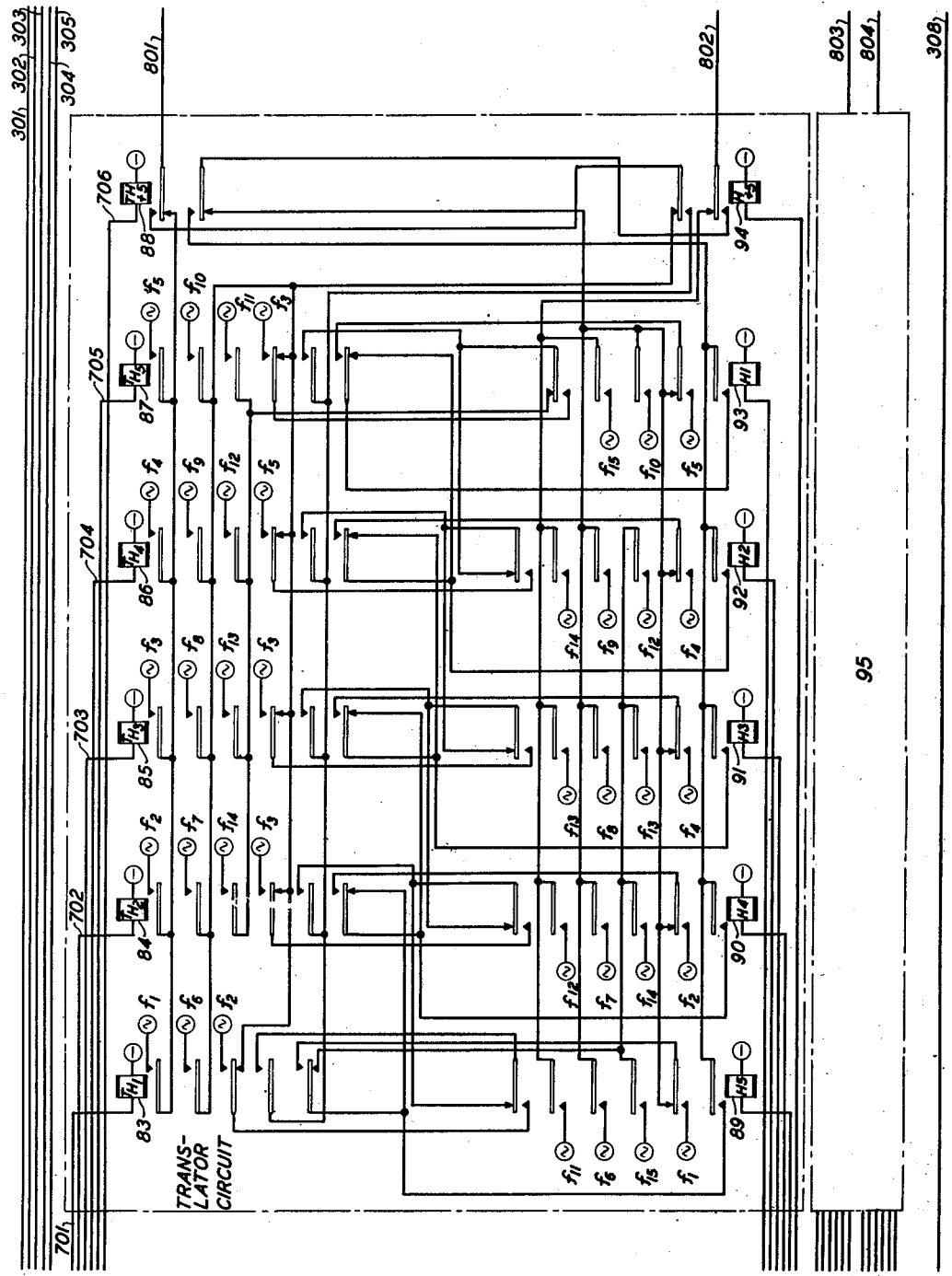
Fig. 8 shows details of the translator circuit of the base station.

When the selector 122 (Fig. 4) stopped on position 1, ground was connected from the armature and contact 1 of the operated relay 45 through the armature and contact 1 of the released relay 47, through the armature and contact 2 of the unoperated relay 44, through the wiper and contact 1 of arc 55 of the selector, through contact 4 and armature of the operated relay 41, over lead 307 to Fig. 7, and through the winding of the connector relay 57 to battery, causing the latter to operate. The operation of relay 57 connects ground from the No. 1 contacts of whichever register relays 77 to 82 are operated, to the corresponding leads in the group of leads 701 to 706, depending on the number which had been registered in Fig. 7. Ground on these leads causes the operation of some of the relays 83 to 88 in the translator of Fig. 8, corresponding to the register relays 77 to 82 of Fig. 7, to register the thousands digit. In a similar manner certain of the relays 89 to 94 of Fig. 8 are operated to register the hundreds digit. The contact network shown on relays 83 to 94 in Fig. 8 is used to translate the thousands and hundreds digits of a four-digit number into a combination of two out of fifteen frequencies ($f_1$ to $f_{15}$, Fig. 8) in the manner described in the aforesaid copending application of Hoth-Soffel, Serial No. 56,186. Block 95 comprises a similar group of relays for translating the tens and units digits. The four frequencies selected by the translator are connected over leads 801, 802, 803 and 804 to Fig. 9, where they are amplified and combined by means of amplifiers 61, 62, 64 and 65 and hybrid coils 63, 66 and 67. The output of hybrid coil 67 is connected to the input of the signaling channel transmitter 68, modulating its carrier. These tones are now received by all idle mobile receivers.

Referring to Fig. 9, the receivers 97 of all idle mobile stations are tuned to the calling channel in the standby condition. Each receiver is of the common superheterodyne type in which the signal from a local oscillator is combined with the incoming signal to produce an intermediate frequency signal. By changing the frequency of the local oscillator the receiver can be tuned to a different channel. In the specific embodiment described herein, a crystal-controlled local oscillator is used and the frequency of the oscillator is changed by substituting a crystal tuned to another frequency. However, any receiver capable of being tuned to different frequencies may be used if suitable tuning arrangements are provided. In Fig. 9, crystal 109 tunes the receiver to the signaling channel and crystal 110 to communication channel 1.

Figure 10:
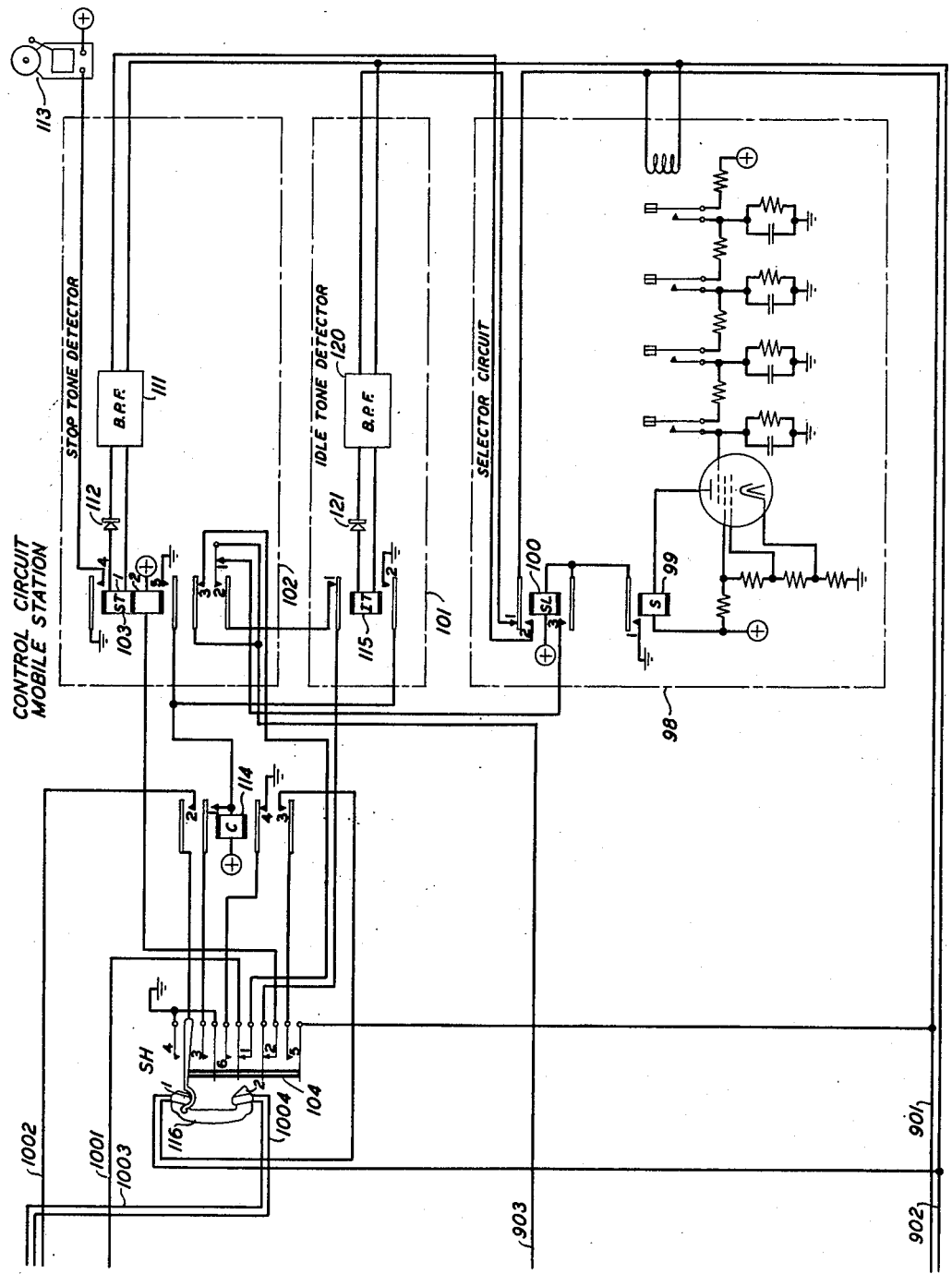
Fig. 10 shows details of the control circuit of a mobile station.

The four signaling tones radiated by the base station are received by each idle mobile receiver 97 and are transmitted over lead 901 to the selector circuit 98 shown in Fig. 10, and back over lead 902 to the mobile receiver. The signaling tones operate the selector of the desired mobile station, and of no other, in the manner described in the pending application of Hoth-Soffel, Serial No. 56,186, thereby operating the selector relay 99. Operation of the selector relay applies ground through its contact 1 and armature to the coil of the signaling lock relay 100 and thence to battery, thus operating the signaling lock relay. Prior to the operation of the signaling lock relay, the output of the mobile receiver 97 shown in Fig. 9 was connected over lead 901 through the armature and contact 1 of the unoperated signaling lock relay 100 to the input of the idle tone detector 101, and back over lead 902 to the mobile receiver. Operation of the signaling lock relay 100 transferred the receiver output from the idle tone detector 101 to the input of the stop tone detector 102 by transferring lead 901 from contact 1 to contact 2 of the signaling lock relay. A path is established from ground through contact 1 of the operated selector relay 99, through the armature and contact 3 of the operated signaling lock relay 100, through contacts 1 and 2 of the unoperated stop tone relay 103, through the armature and contact 3 of the stop tone relay, through contact 1 and the armature of the unoperated switchhook 104, over lead 1001 to the motor 105 shown in Fig. 9, and thence to battery. The motor starts running, driving the tuning switches 106, 107 and 108. When the wiper of switch 107 moves a short distance, ground is applied to lead 903. The motor continues to operate and the wiper of switch 108 moves off segment 1, disconnecting crystal 109 from the mobile receiver 97. The four signaling tones are no longer received and the selector relay 99, Fig. 10, releases. The signaling lock relay 100 remains operated by a path from battery through its coil, through its armature and contact 3, through contacts 1 and 2 of the unoperated stop tone relay 103, over lead 903 to the wiper of switch 107, Fig. 9, and thence to ground. The motor 105 continues to operate over a path from ground through switch 107, lead 903, the armature and contact 3 of the unoperated stop tone relay 103, through contact 1 and the armature of the unoperated switchhook 104, and thence over lead 1001 to the winding of the motor 105, Fig. 9, and thence to battery. The wiper of switch 108 moves to segment 2 thereby connecting crystal 110 to the mobile receiver 97 and thus effecting the tuning of the receiver 97 to channel 1. Since stop tone is being transmitted from the base station on channel 1, it is received and transmitted over lead 901 through armature and contact 2 of the operated signaling lock relay 100, Fig. 10, to the input of the stop tone detector 102 and back to the receiver over lead 902. The signal is transmitted through the band-pass filter 111 and the rectifier 112 to coil 1 of the stop tone relay 103. The stop tone relay operates and closes a path from ground through its armature and its contact 4 to the call bell 113 and thence to battery thereby causing the call bell to ring. The signaling lock relay 100 releases when contacts 1 and 2 of the stop tone relay 103 open. The motor 105, Fig. 9, stops when contact 3 of the stop tone relay 103, Fig. 10, opens. The receiver remains tuned to channel 1. Since switch 106, Fig. 9, has also been driven around by the motor, crystal 119 is now connected to the mobile transmitter 117 and the transmitter is tuned to channel 1.

Again referring to Fig. 10, a path is established from ground through contact 5 and the armature of the operated stop tone relay 103 to the coil of the control relay 114 and thence to battery, operating the control relay. When the signaling lock relay 100 is released by the operation of the stop tone relay 103, as described above, thereby disconnecting the output of receiver 97 from the stop tone detector 102, relay 103 remains operated by a path from battery through its coil 2, through contact 2 and the armature of the unoperated switchhook 104, through the armature and contact 1 of the unoperated idle tone relay 115, through the armature and contact 2 of the operated stop tone relay 103, over lead 903 to Fig. 10 to switch 107 and thence to ground. When the called subscriber removes the handset 116 from the switchhook 104 the mobile transmitter 117, Fig. 9, is activated by the transmitter control 118, which is operated by a path to ground applied over lead 1002 through contact 2 and the armature of the control relay 114, Fig. 10, through the armature and contact 4 of the switchhook 104 and thence to ground. The transmitter thereupon radiates carrier. Operation of switchhook 104 releases relay 103 and locks relay 114 by a path from battery through the latter's coil, through its contact 1 and armature, and through contact 3 and the armature of switchhook 104 to ground. The switchhook 104 is so adjusted that contact 3 makes with its armature before contact 2 breaks from its armature. The telephone receiver 1 of the handset 116 is connected through contact 3 and the armature of the operated control relay 114, through contact 5 and the armature of the operated switchhook 104, thence over lead 901 to the mobile receiver and back over lead 902 to the telephone receiver. The mobile station is now in the talking condition. All relays in Fig. 10 are unoperated except the control relay 114, which remains operated for the duration of the call.

When the base station receiver 70 (Fig. 9) receives carrier from the mobile transmitter, its codan circuit 71 is caused to connect ground over lead 305 to Fig. 3, through the winding of the codan operated relay 39 to battery, causing this relay to operate. The operation of relay 39 opens contacts 1 and 2, removing stop tone from the transmitter 72 of channel 1 in Fig. 9. The operation of relay 39 also connects ground from its armature and contact 3 through the line lamp 35 to battery, causing the latter to light. When the line lamp operates the operator releases dial key 33, causing the register to restore to normal. The operation of relay 39 opens the circuit through its No. 4 contact, causing the release of the first start relay 41 in Fig. 4. The release of relay 41 opens the circuit to relay 45, allowing it to be released. The release of relay 45 restores all relays in Fig. 4 to normal, releases the connector relay 57 in Fig. 7 and restores the signal channel transmitter 68 in Fig. 9 to normal.

To establish the talking path, the operator operates the talk key 32 in Fig. 3, connecting ground through its contact to the winding of the talk relay 37, causing it to operate. The operation of relay 37 disconnects the conductors TC1 and TC2 of the tone circuit TC from leads 302 and 301, respectively, and immediately thereafter connects the transmitter and receiver in Fig. 9 to the hybrid coil 36 over leads 301 to 304.

When the called subscriber returns his handset 116 to the switchhook 104, Fig. 10, switchhook contact 4 and the armature open, thereby opening the path to the transmitter control circuit 118, Fig. 9, and turning off the mobile transmitter 117. The armature and contact 3 of the switchhook open, releasing the control relay 114. A path is established from ground through the arc and wiper of switch 107, Fig. 9, over lead 903 to the armature and contact 3 of the unoperated stop tone relay 103, Fig. 10, through contact 1 and the armature of the unoperated switchhook 104, thence over lead 1001 to the motor 105, Fig. 9, drives switches 106, 107 and 108. Switch 108 connects crystal 110 in place of 109, tuning the mobile receiver 97 to channel 1. Assuming channel 1 is idle, idle tone is being transmitted on channel 1 by the base station. The idle tone is transmitted from the mobile receiver 97 over lead 901, through the armature and contact 1 of the unoperated signaling lock relay 100, Fig. 10, to the input of the idle tone detector 101 and thence back over lead 902 to the mobile receiver. In the idle tone detector 101 the signal is transmitted through the band-pass filter 120 and the rectifier 121 to the coil of the idle tone relay 115, causing it to operate. A path is established from ground through contact 2 of the idle tone relay and its armature to the coil of the unoperated control relay 114 and thence to battery, causing the control relay to operate. When the idle tone is subsequently removed at the base station, the control relay 114 continues to operate through a path from battery, through its winding, through its contact 1 and armature, through contact 3 and the armature of the operated switchhook 104 and thence to ground. The motor 105, Fig. 9, stops when its operating path is opened by the opening of contact 4 and the armature of the control relay 114, Fig. 10. A path is established from ground through contact 4 and the armature of the operated switch hook 104, Fig. 10, thence through the armature and contact 2 of the operated control relay 114, and thence over lead 1002 to the transmitter control circuit 118, Fig. 9, causing the transmitter control circuit to activate the mobile transmitter 117. The output of the mobile receiver is connected over lead 901 through the armature and contact 5 of the operated switchhook 104, Fig. 10, through the armature and contact 3 of the operated control relay 114, thence to the telephone receiver 1 of the handset 116, and back over lead 902 to the mobile receiver. The transmitter 2 of the handset 116 is connected over lead 1003 to the input of the mobile transmitter 117, Fig. 9, and back over lead 1004 to the telephone transmitter of the handset. The mobile station is now in the talking condition.

When the mobile carrier is received by the base station receiver 70 in Fig. 9, its codan circuit 71 is energized, connecting ground over lead 305 to Fig. 3, causing the codan operated relay 39 to operate. Operation of relay 39 disconnects the idle tone oscillator 40 from the conductors TC1 and TC2 of the tone circuit TC connected by contacts 1 and 4 and associated armatures of relay 37 to the base station transmitter 72 in Fig. 9 for this channel. Operation of relay 39 connects ground from its armature and contact 3 to line lamp 35, causing it to light. When the line lamp lights, the operator plugs the cord from her cord circuit into the line jack 31, operating relay 38 as described for a base station originating call. Relay 38 at this time performs no useful function. The operator then operates talking key 32 which connects ground through its contact to operate talk relay 37, which connects the base station transmitter and receiver to the hybrid coil 36 as previously described. The operator can now determine what number the mobile subscriber desires and establish the call in the standard manner. At the end of the call, disconnection takes place as previously described for a base station originating call.

If the mobile station attempts to originate a call when no channel is idle, the operations are the same as described previously for a mobile originating call. However, since idle tone is not received on any channel the mobile station continues to hunt over each channel in turn as described above, but receives no idle tone and so continues to hunt until the mobile subscriber abandons the attempt, whereupon it stops hunting and the mobile receiver is again tuned to the calling channel.

It is to be understood that the above-described arrangement is illustrative of the principles of the invention. Other arrangements may be devised by those skilled in the art without departing from the spirit and scope of the invention.

What is claimed is:

1. In a two-way radio communication system including a base station having a plurality of transmitters and receivers all tuned to different frequencies, each of said transmitters being paired with a respectively different one of said receivers, the circuits and carriers associated with each pair of said transmitters and receivers constituting a communication channel, a separate calling transmitter at said base station tuned to still another frequency, and means for adding a control tone designated idle tone on the carrier of each idle communication channel, and a plurality of mobile stations each having a tunable transmitter and receiver, tuning means for tuning said mobile transmitter and receiver successively to said communication channels or to said calling frequency, said mobile receivers in the standby condition being tuned to said calling frequency, a telephone instrument, holding means for holding said instrument during idle periods, and a call indicator; means under the control of said base station operator for tuning the transmitter and receiver of a desired mobile station to a selected idle communication channel comprising means at said base station for adding a combination of selective calling tones on the carrier of said calling transmitter, said combination being different for each mobile station, means for substituting a control tone designated stop tone for the idle tone on said selected channel, a selective detector of said calling tones and a selective detector of said stop tone in the output circuit of each of said mobile receivers, means controlled by said calling tone detector for starting the operation of said tuning means, and means controlled by said stop tone detector for stopping the operation of said tuning means so that said transmitter and receiver remain tuned to the said selected channel, means controlled by said calling tone detector for operating said call indicator, and means at said base station responsive to waves emitted by said tuned mobile transmitter for removing said stop tone from said selected channel; means responsive to the removal of said instrument from said holding means upon initiating a call from said mobile station to start the operation of said tuning means, a selective detector of said idle tone in the output of said mobile receiver, means controlled by said idle tone detector for stopping the operation of said tuning means so that said transmitter and receiver remain tuned for the duration of the call to the first channel marked by said idle tone that is tuned in, means at said base station responsive to waves emitted by said tuned mobile transmitter for removing said idle tone from the channel to which said mobile station has been tuned, thereby preventing any other of said mobile stations from tuning to the same channel, and means at said mobile station for automatically retuning said mobile receiver to and thence to battery, causing the motor to run. The telephone receiver 1 of the handset 116 is disconnected from the output of the mobile receiver 97, Fig. 9, by the opening of contact 5 and the armature of the switchhook 104, Fig. 10. The motor continues to run until the signaling channel is reached, whereupon switch 107 removes ground from lead 903, causing the motor to stop. When the mobile carrier is removed, the codan circuit 71 in Fig. 9 is restored to normal, allowing relay 39 in Fig. 3 to release. The release of relay 39 extinguishes the line lamp 35. The operator then restores the talking key to normal and removes the plug from the line jack 31, whereupon all relays in Fig. 3 restore to normal.

*Mobile station fails to answer*

A case will now be described in which the mobile subscriber fails to answer a call from the base station. The circuits perform as described above until the stop tone relay 103 of Fig. 10 has operated and the call bell 113 rings. At this point the stop tone relay 103 is operated and all other relays of Fig. 10 are unoperated. The tuning motor 105, Fig. 9, is stopped. If, after a suitable interval, the operator at the base station abandons the attempt to reach the mobile station, she removes her plug from line jack 31, Fig. 3. This causes all relays in the base station to restore to normal and idle tone to be restored to the channel. Idle tone is received in the mobile receiver, Fig. 9. The idle tone is transmitted over lead 901, through the armature and contact 1 of the unoperated signaling lock relay 100, Fig. 10, to the idle tone detector 101 and back over lead 902 to the mobile receiver. In the idle tone detector, the idle tone passes through the band-pass filter 120, the rectifier 121 and to the coil of the idle tone relay 115, causing it to operate. Operation of the idle tone relay opens its contact 1 and armature, opening the path between coil 2 of the stop tone relay 103 and ground, allowing the stop tone relay to release. The release of the stop tone relay 103 closes a path from ground through the arc and wiper of switch 107, Fig. 9, over lead 903, through the armature and contact 3 of the unoperated stop tone relay 103, Fig. 10, through contact 1 and the armature of the switchhook 104, thence over lead 1001 to the motor 105, Fig. 9, and thence to battery, causing the motor to run. The motor continues to run until switch 107 opens the path from ground to lead 903 and then stops. Crystal 109 is now connected, the receiver is tuned to the calling channel, and all circuits have returned to normal.

*Simultaneous calls by base station*

A description will now be given of the case in which two outgoing calls are originated simultaneously from the base station. Assuming these calls to originate on channels 1 and 2 in the manner previously described, the first start relay 41 in Fig. 4 will be operated. In a similar manner the intermediate start relay 42 will also be operated. The path now established from ground on the armature of the operated relay 41 through its No. 2 contact, through the armature and No. 4 contact of the operated relay 42, and through the winding of the multiple start relay 44 to battery, causes the latter to operate. The operation of relay 44 sets in motion the same chain of events as previously described for the operation of relay 45. The selector will advance until it reaches either terminal 1 or 2 of the selector. When the selector stops, relay 47 releases as previously described. Assuming that the selector first stops on terminal 1, a path is now established from ground on the armature of the operated relay 44 to its contact 1, through the armature and contact 1 of the released relay 47, through the armature and contact 2 of the slow-to-operate ringing timing relay 46, through the wiper and contact 1 of arc 55 of the selector, and over the path previously described to operate the connector relay 57 in Fig. 7.

When the selector control relay 48 (Fig. 4) released at the time the selector stopped hunting, a path was closed from the armature and contact 1 of the operated relay 44, through the contact 1 and armature of relay 48, and through the winding of relay 46 to battery. Relay 46 is slow to operate, requiring approximately one second. After approximately one second, relay 46 operates, opening the circuit previously described to the connector relay 57 in Fig. 7. This removes the ringing tone from the signaling channel transmitter. The operation of relay 46 connects ground from its armature and No. 1 contact through the armature and No. 3 contact of the operated relay 44 to operate the hunting timing relay 49. This relay is slow to operate in order to allow the mobile receiver time in which to find channel 1 if it has already started to hunt. After an interval sufficiently long to insure that all mobile receivers are again on the signaling channel, relay 49 operates. The operation of relay 49 opens the circuit to the winding of the stop tone relay 50, causing it to release and remove stop tone from channel 1. The operation of relay 49 also connects ground from its armature through its No. 2 contact to the winding of the selector control relay 48, causing it to operate. The operation of relay 48 energizes selector magnet 52 as previously described. The operation of relay 48 also opens the circuit to the ringing timing relay 46, causing it to release. The release of relay 46 opens the circuit to the winding of relay 49, causing it to release. The release of relay 49 permits relay 48 to release, in turn releasing selector magnet 52 and allowing the selector to advance to position 2. Since the intermediate start relay 42 is also operated, the selector remains in this position and a path similar to the one previously described for channel 1 is established to operate the connector relay in the channel 2 register and to connect stop tone to channel 2. If the subscriber being called on channel 2 does not respond within the time provided by the ringing timing relay 46, the selector is again caused to hunt. In the case being described the selector will hunt to position 1. The above sequence of events will continue until one of the subscribers answers, whereupon the corresponding start relay will be released as previously described. The release of this start relay will cause the release of the multiple start relay 44 and the operation of the single start relay 45. Ringing will now continue on this channel until this subscriber answers. The circuits are restored to normal as described above.

*Call originated by a mobile station*

A mobile originating call will now be described. Referring to Fig. 10, the subscriber removes his handset 116 from the switchhook 104. Operation of the switchhook contacts causes the motor 105, Fig. 9, to operate through a path from battery through its windings, through lead 1001 to the armature and contact 6 of the operated switchhook, and through the armature and contact 4 of the unoperated control relay 114. The motor said calling frequency upon the termination of a call.

2. The combination specified in claim 1 wherein said mobile station tuning means comprises tuning crystals for said transmitter and receiver, a selecting switch for said crystals, and a motor for operating said switch.

3. A radiant energy signaling system having a plurality of radiant energy signaling channels allotted thereto for the transmission of carrier waves, said system including a signaling station comprising in combination a plurality of transmitting means each operable to radiate carrier energy over a respectively different one of said channels continuously, a plurality of line circuits each extending to a respectively different one of said transmitting means, each of said line circuits including a tone circuit having a source of idle tone normally connected thereover to the associated transmitting means for modulating its carrier energy, a single source of stop tone, a plurality of connecting circuits extending from said stop tone source to each of said line circuits, each of said line circuits having control means for conditioning it for the transmission of intelligence signals to the associated transmitting means for modulation of its carrier energy, and electroresponsive means in each of said line circuits responsive to the operation of the associated control means for disconnecting the associated idle tone source from the associated tone circuit and for substituting therefor said stop tone source.

4. A radiant energy signaling system in accordance with claim 3 and having a second signaling station comprising in combination radiant energy communication equipment including a telephone instrument and holding means for holding said instrument during idle periods, tuning means including motor-driven means for tuning said equipment for operation with any one of said channels, and operating means responsive to the removal of said instrument from said holding means for operating said motor-driven means to tune said equipment to one of the channels over which said idle tone modulated carrier is being transmitted.

5. A radiant energy signaling system in accordance with claim 3 wherein said signaling system has a calling channel allotted thereto and wherein said signaling station includes additional transmitting means for radiating carrier energy continuously over said calling channel, said stop tone source being normally disconnected from said line circuits, calling means in each of said line circuits for impressing calling signals upon the carrier transmitted over said calling channel, and additional electroresponsive means responsive to the operation of the calling means in any one of said line circuits for connecting said stop tone source to a selected one of said connecting circuits for modulation of the carrier energy of the associated transmitting means.

6. A radiant energy signaling system in accordance with claim 5 and having a second signaling station comprising in combination radiant energy communication equipment, tuning means including motor-driven means for tuning said equipment for operation with one of said channels, a portion of said equipment being normally tuned to said calling channel, and operating means responsive to the reception by said equipment of an assigned combination of calling signals transmitted over said calling channel for operating said motor-driven means to tune said equipment to the channel over which said stop tone modulated carrier is being transmitted.

DANIEL F. HOTH.
ROBERT O. SOFFEL.

References Cited in the file of this patent

UNITED STATES PATENTS

| Number | Name | Date |
|---|---|---|
| 1,608,551 | Demarest et al. | Nov. 30, 1926 |
| 2,265,056 | Bowers | Dec. 2, 1941 |
| 2,383,908 | Bowers | Aug. 28, 1945 |
| 2,458,558 | Bradley | Jan. 11, 1949 |
| 2,475,675 | Peterson | July 12, 1949 |
| 2,479,701 | Ress | Aug. 23, 1949 |
| 2,501,091 | Preston et al. | Mar. 21, 1950 |